United States Patent [19]

Tai

[11] Patent Number: 5,486,959
[45] Date of Patent: Jan. 23, 1996

[54] ADAPTER MECHANISM FOR EXTRACTING AND RETRACTING VIDEO TAPE FROM MINIATURE CASSETTES

[76] Inventor: David Tai, 1st Fl., No. 17, Lane 180, Ho-Chiang Street, Taipei, Taiwan

[21] Appl. No.: 273,796

[22] Filed: Jul. 12, 1994

[51] Int. Cl.$^6$ .................................................. G11B 5/008
[52] U.S. Cl. ............................................................ 360/94
[58] Field of Search ................................................ 360/94

[56] References Cited

U.S. PATENT DOCUMENTS

| 4,554,603 | 11/1985 | Tsuchiya | 360/94 |
| 4,595,962 | 6/1986 | D'Alayer de Costemore D'Arc | 360/94 |

*Primary Examiner*—John H. Wolff
*Assistant Examiner*—Adriana Giordana
*Attorney, Agent, or Firm*—Morton J. Rosenberg; David I. Klein

[57] ABSTRACT

A video cassette adapter includes a motor powered by a battery to drive two tape-driving members to move toward an operative position and automatically pull a tape of the cassette placed in the adpater out of the cassette for playing or recording operation or move toward a non operative position and automatically pull the tape back into the cassette. A selective power-transmitting mechanism according to the clockwise or counterclockwise rotational motion of the motor selectively transmits the power of the motor to the tape-driving members so as to automatically conduct and pull the tape out of the cassette to the operative position or transmits the power of the motor to the cassette so as to automatically wind the tape from the operative position of the adapter back into the cassette.

9 Claims, 13 Drawing Sheets

ADAPTER MECHANISM FOR EXTRACTING AND RETRACTING VIDEO TAPE FROM MINIATURE CASSETTES

BACKGROUND OF THE INVENTION

The present invention relates to a video cassette adapter, and more particularly to an adapter which is used to contain a VHS-C type video cassette and placed into a VHS type video cassette recorder for displaying or recording operation. The present video cassette adapter is operated by a motor to pull the tape of the video cassette out of the cassette in an operative position and return the tape into the cassette in a non operative position.

A VHS type video cassette is a most widely used video recording medium nowadays. The VHS type video cassette has a large dimension of 188 mm×104 mm×25 mm and is unsuitable to be carried outdoors for shooting views or articles. Therefore, a smaller VHS-C type compact video cassette is developed to minimize the dimension of the video cassette. Such VHS-C type video cassette has a dimension of 92 mm×59 mm×22 mm can be easily carried and used. The width of the tape of the VHS-C type video cassette is identical to that of the tape of the VHS type video tape. Therefore, the VHS-C type video cassette can be first placed into a video cassette adpater and converted into a pattern of the VHS type video cassette and then the adapter with the VHS-C type video cassette can be placed into a VHS recorder for displaying or recording operation.

Because the VHS-C type video cassette has a length of only 92 mm while the adapter has a length of 188 mm, before playing the cassette, the exposed tape of the VHS-C type video cassette at the opening thereof must be first elongated to have a length as that of the exposed tape of the VHS type video cassette so as to meet the operational requirement of the VHS recorder. Therefore, the adapter includes two rotatable tape-driving members for conducting and pulling the tape of the VHS-C type video cassette out of the cassette to the opening of the adapter for playing or recording operation. In a conventional video cassette adapter, the tape-conducting operation is performed manually and this is inconvenient to the user. Especially, in order to conduct the tape from the opening of the cassette to the opening of the adapter, the two tape-driving members must be rotated through a large angle by the user's hands. This is quite troublesome to the user.

Therefore, it is necessary to provide the adapter with a motor and battery to electrically drive the two tape-driving members to automatically pull out the tape and wind up the tape.

SUMMARY OF THE INVENTION

It is therefore a primary object of the present invention to provide a video cassette adapter including a motor and a battery supplying power for the motor. The motor drives two tape-driving members to automatically conduct and pull the tape of the cassette from the opening thereof to the opening of the adapter or wind the tape back into the cassette.

The present invention can be best understood through the following description and accompanying drawing, wherein:

DETAILED DESCRIPTION OF THE PREFERRED EMBODIMENTS

Figure 1:
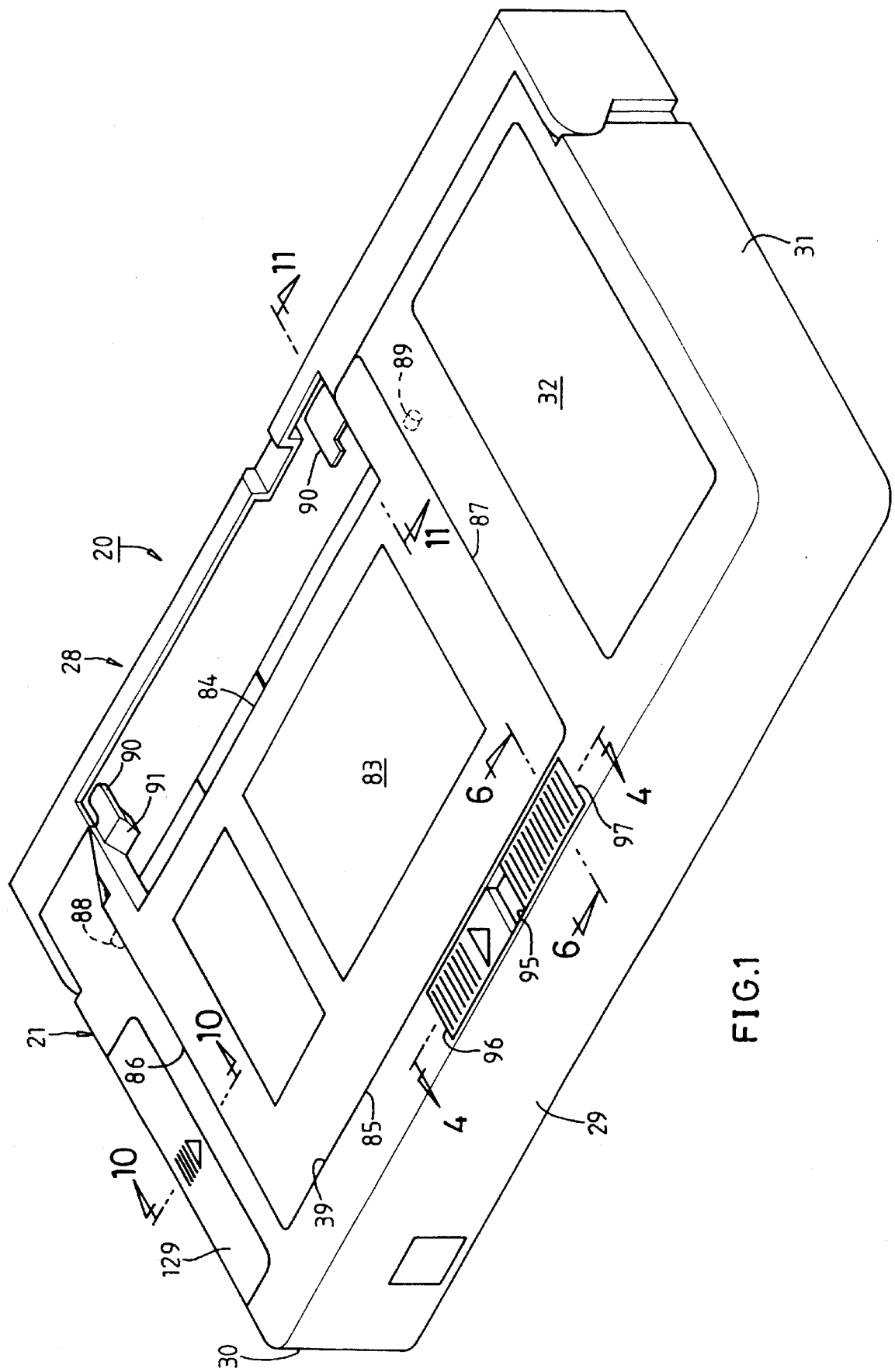
FIG. 1 is a perspective view of the adapter of the present invention.
Figure 2:
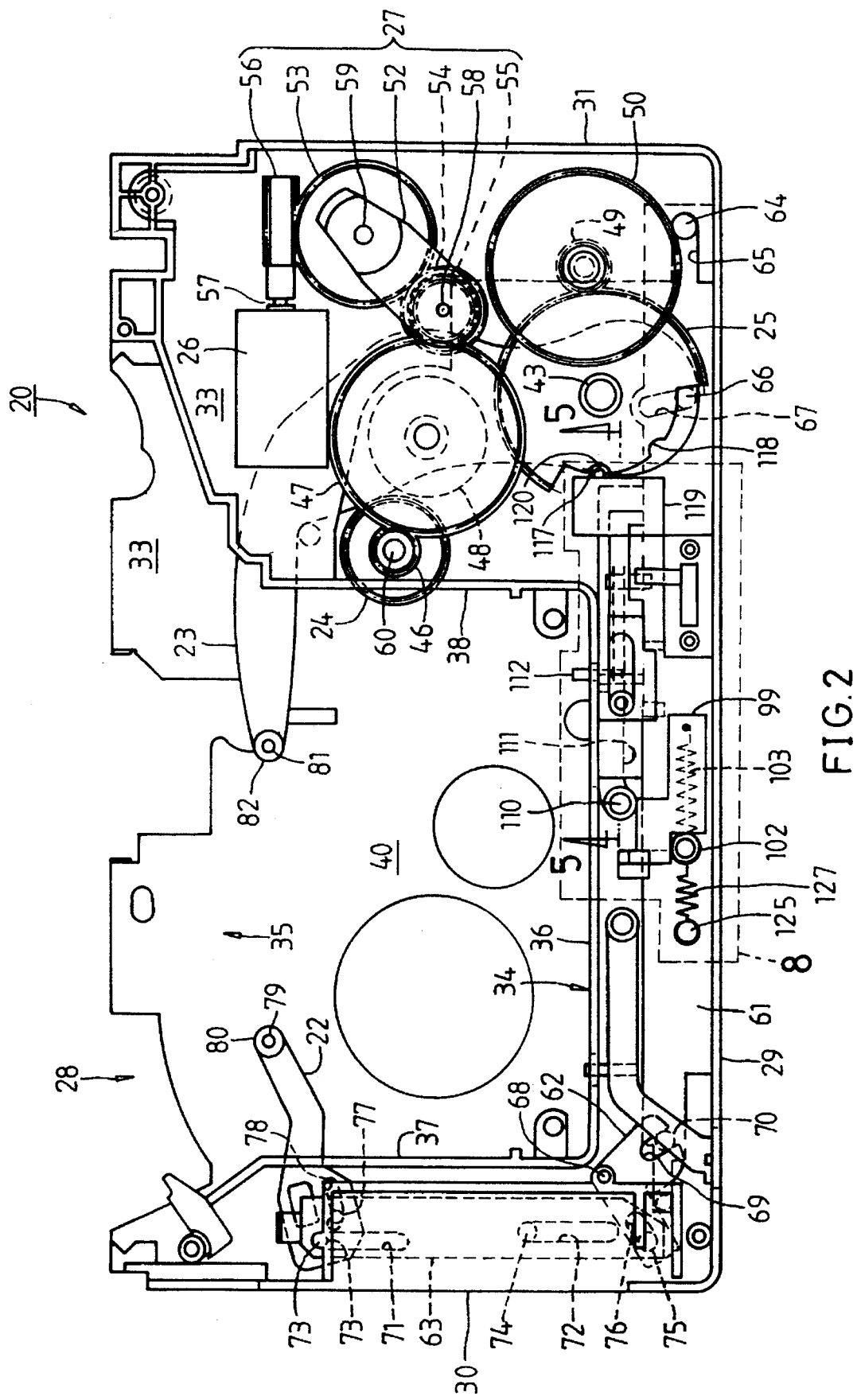
FIG. 2 is a top view of the present adapter with the top cover removed, wherein the two tape-driving members are positioned in a non operative position.
Figure 3:
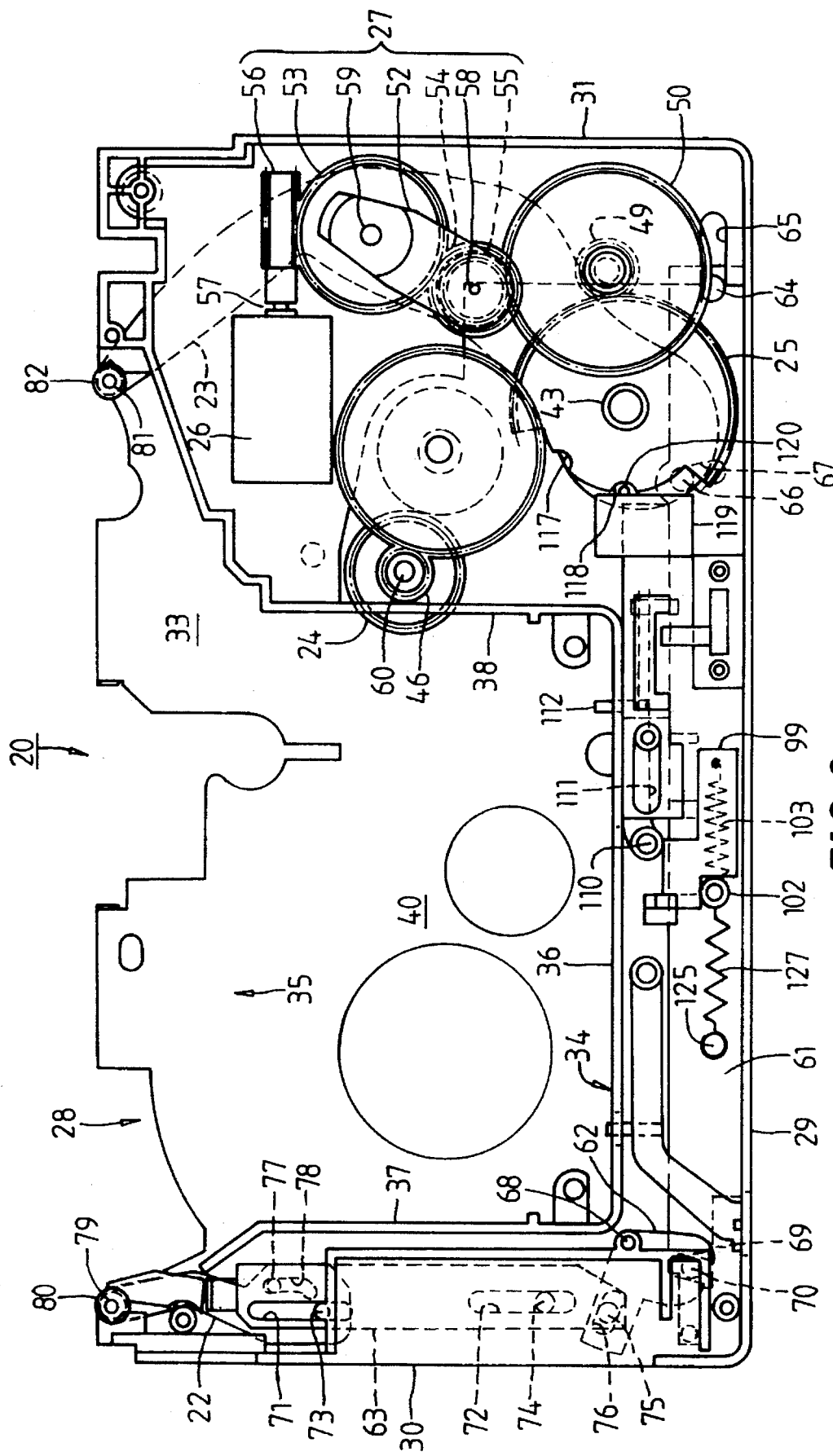
FIG. 3 is a view according to FIG. 2, wherein the two tape-driving members are moved from the non operative position to an operative position.

Please refer to FIGS. 1 to 3. The video cassette adapter 20 of the present invention includes a housing 21, a first tape-driving member 22, a second tape-driving member 23, a first gear 24, a second gear 25, a motor 26 and a selective power-transmitting mechanism 27. The housing 21 has a front portion 28, a back portion 29, a first and a second side portions 30, 31, a top wall 32, a bottom wall 33 and a recess 34 for receiving the video cassette. The recess 34 has a front portion 35, a back portion 36, a first and a second side portions 37, 38, a top opening 39 and a bottom wall 40. The front portion 35 of the recess 34 is communicated with the front portion 28 of the housing 21.

As shown in FIGS. 2 and 3, one end of the first tape-driving member 22 is pivoted on a pin member 73 between the first side portion 30 of the housing 21 and the first side portion 37 of the recess 34. The other end of the first tape-driving member 22 is pivotally connected with a roller 80 and can be moved from the front portion 35 of the recess 34 to an operative position of the front portion 28 of the housing 21 or moved from the front portion 28 of the housing 21 to a non operative position of the front portion 35 of the recess 34.

As shown in FIGS. 2 and 3, one end of the second tape-driving member 23 is pivoted on a pivot shaft 43 between the second side portion 31 of the housing 21 and the second side portion 38 of the recess 34. The other end of the second tape-driving member 23 is pivotally connected with a roller 82 and can be moved from the front portion 35 of the recess 34 to an operative position of the front portion 28 of the housing 21 or moved from the front portion 28 of the housing 21 to a non operative position of the front portion 35 of the recess 34.

The first gear 24 is rotatably disposed on a shaft member 60 in the housing 21 and extends into the second side portion 38 of the recess 34 for meshing with a gear disposed on a tape-winding shaft of the video cassette (not shown).

The first gear 24 is coaxially rotatable with another gear 46 which meshes with another gear 47. The gear 47 is coaxially rotatable with a driving wheel 48 which is fitted with and rotatable with a tape-winding shaft (not shown) of a video cassette recorder.

The second gear 25 is coaxially disposed on or integrally formed on the pivot shaft 43 which pivotally connects the second tape-driving member 23 with the housing 21.

The second gear 25 is sector-shaped and meshes with a gear 49 which is coaxially rotatable with a gear 50 having larger diameter.

The motor 26 is fixedly disposed in the housing 21 near a front right corner thereof.

As shown in FIGS. 2 and 3, the selective power-transmitting mechanism 27 includes a spiral wheel 56, a power inputting portion and a power outputting portion, wherein the power inputting portion is operably connected with the motor 26 via the spiral wheel 56. The selective power-transmitting mechanism 27 is pivotally disposed in the housing 21 with the power outputting portion thereof moved between a first selection position where the power outputting portion is indirectly or directly operably connected with the first gear 24 as shown in FIG. 2 and a second selection position where the power outputting portion is indirectly or directly operably connected with the second gear 25 as shown in FIG. 3.

Referring to FIGS. 2 and 3, the selective power-transmitting mechanism 27 further includes a rotary arm 52, a sun wheel 53 and two planet wheels 54, 55. The spiral wheel 56 is disposed on a rotary shaft 57 of the motor 26 and rotarily driven thereby. The sun wheel 53 is rotatably disposed about a shaft 59 on the bottom wall 33 of the housing 21. The sun wheel 53 is also a spiral wheel and meshes with the spiral wheel 56. It should be noted that the spiral wheel 56 and sun wheel 53 can be alternatively substituted by an assembly of a spiral rod and a spiral wheel. The rotary arm 52 is pivotally disposed on the shaft 59 and the two planet wheels 54, 55 are coaxially rotatably disposed a movable end of the rotary arm 52 via a shaft 58.

When the motor 26 clockwise rotates, the power generated thereby is sequentially transmitted through the spiral wheel 56 to drive the sun wheel 53 to counterclockwise rotate. At this time, the frictional force between the sun wheel 53 and the shaft 59 or the frictional force between the shaft 59 and the rotary arm 52 will make the rotary arm 52 counterclockwise rotate about the shaft 59 and thus make the planet wheels 54, 55 together counterclockwise revolve around the sun wheel 53, wherein the planet wheel 55 is to mesh with the gear 50 and once the planet wheel 55 meshes with the gear 50, the engagement between the rotary arm 52 and the sun wheel 53 becomes idle. At this time, the power is transmitted sequentially through the sun wheel 53, planet wheels 54, 55, gear 50 and gear 49 to the second gear 25, making the second tape-driving member 23 rotate clockwise about the pivot shaft 43, that is, making the second tape-driving member 23 move from the non operative position as shown in FIG. 2 to the operative position as shown in FIG. 3.

When the motor 26 rotates counterclockwise, the power generated thereby is transmitted sequentially through the spiral wheel 56 to drive the sun wheel 53 to clockwise rotate. At this time, the frictional force between the sun wheel 53 and the shaft 59 or the frictional force between the shaft 59 and the rotary arm 52 makes the rotary arm 52 clockwise rotate about the shaft 59 and makes the planet wheels 54, 55 clockwise revolve around the sun wheel 53, wherein once the planet wheel 55 disengages from the gear 50 and meshes with the gear 47, the power of the motor 26 is transmitted through the spiral wheel 56, sun wheel 53, planet wheels 54, 55, gear 47 and gear 46 to make the first gear 24 rotate. At this time, the first gear 24 drives the tape-winding wheel of the video cassette to rotate and wind up the tape. When wound, the tape simultaneously pulls the first tape-driving member 22 and second tape-driving member 23 from the operative position as shown in FIG. 3 back to the non operative position as shown in FIG. 2.

As shown in FIGS. 2 and 3, the adapter of the present invention further includes a first transmission rod 61, a pivoting rod 62 and a second transmission rod 63. The first transmission rod 61 is slidably disposed between the back portion 29 of the housing 21 and the back portion 36 of the recess 34 via a pin member 64 and a guide slot 65. A right end of the first transmission rod 61 is operably connected with a pin member 66 of the second tape-driving member 23 via the guide slot 67, whereby the rotary motion of the second tape-driving member 23 can be transmitted through the pin member 66 and the guide slot 67 to make the first transmission rod 61 move left or right.

The pivoting rod 62 is pivotally disposed via a pivot pin 68 in an area defined by the first side portion 30 and back portion 29 of the housing 21 and the first side portion 37 and back portion 36 of the recess 34. The pivoting rod 62 via a guide slot 69 disposed at one end of the pivoting rod 62 is connected with a pin member 70 located at a left end of the first transmission rod 61.

The second transmission rod 63 is slidably disposed via two guide slots 71, 72 and a pin member 73 between the first side portion 30 of the housing 21 and the first side portion 37 of the recess 34. A lower end of the second transmission rod 63 is operably connected via a pin member 75 with a guide slot 76 disposed at the other end of the pivoting rod 62. An upper end of the second transmission rod 63 is operably connected via a pin member 77 with a guide slot 78 of the first tape-driving member 22

A movable end of the first tape-driving member 22 is disposed with a shaft 79. The roller 80 is rotatably fitted around the shaft 79 so that the tape can easily smoothly slide over the roller 80. Similarly, a movable end of the second tape-driving member 23 is disposed with a shaft 81 around which the roller 82 is fitted, permitting the tape to easily smoothly slide over the roller 82.

Referring to FIGS. 1, 2, 11 and 12, the adapter 10 of the present invention further includes a top cover 83 having a front edge 84, a back edge 85 and two opposite lateral edges 86, 87. The top cover 83 covers the top opening 39 of the recess 34. Two ends of the front edge 84 of the top cover 83 respectively have pivot sections 88, 89 which respectively pivotally connect with the first and second side portions 37, 38 of the recess 34, so that the top cover 83 can be pivoted between the top opening 39 and the front portion 35 of the recess 34. A prying section 90 extends forward from one end of the front edge 84 of the top cover 83, whereby when the top cover 83 is pivoted open, the prying section 90 extends into an inner side of a dustproof cover of the video cassette and when the top cover 83 is pivoted to cover the top opening 39, the prying section 90 pivots the dustproof cover from the front portion 35 of the recess 34 to the top wall 32 of the housing 21.

Figure 11:
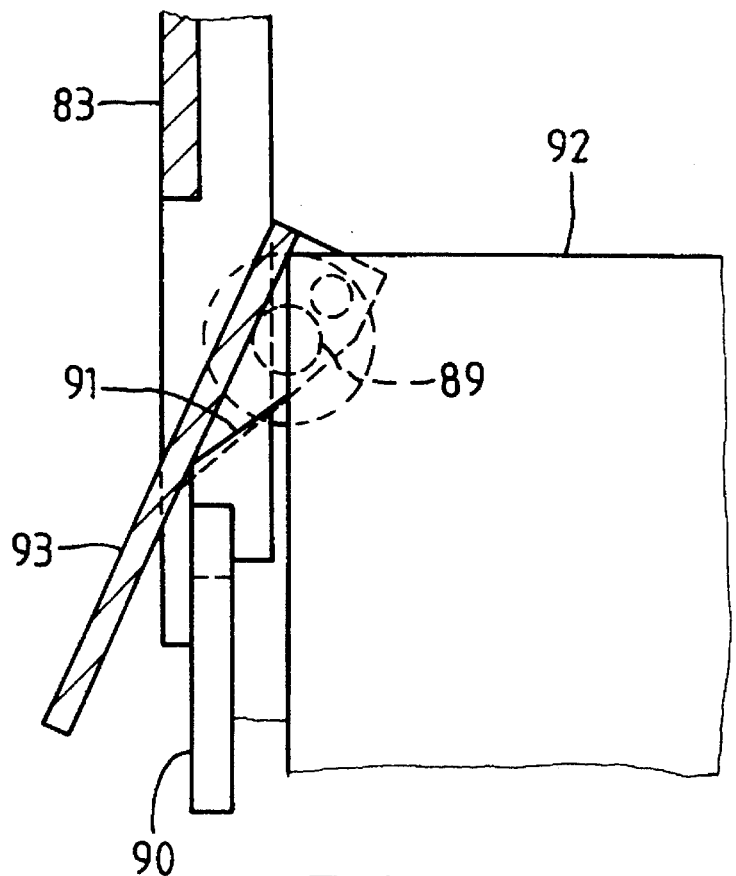
FIG. 11 is a sectional view taken along line 11—11 of FIG. 1, showing that the top cover is opened in an upright state and the video cassette is placed into the recess of the housing of the adapter.
Figure 12:
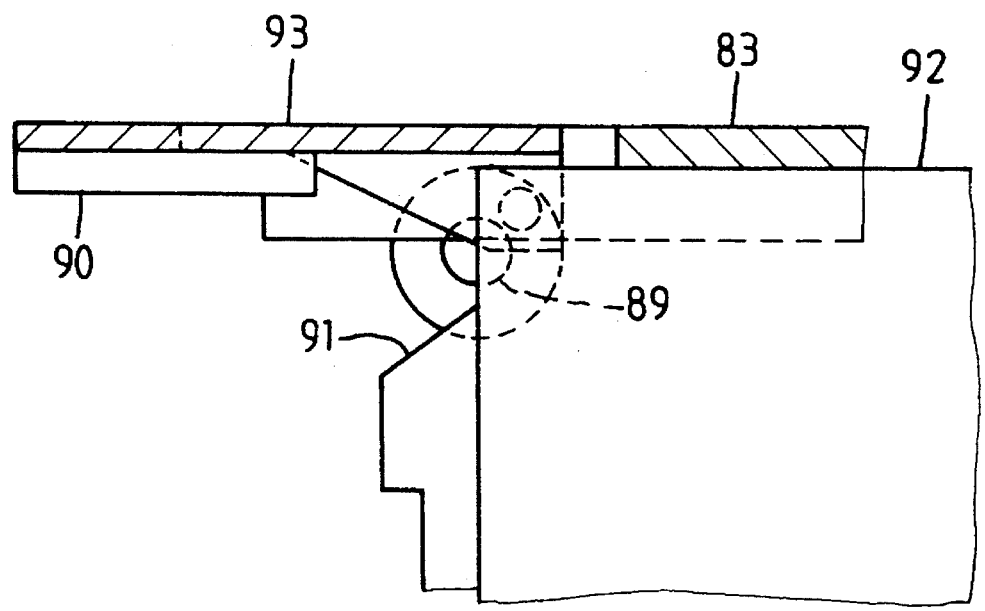
FIG. 12 is a view according to FIG. 11, showing that the top cover is subsequently rotated into a horizontal state and the dustproof cover of the cassette is opened into a horizontal state.

Referring to FIGS. 1, 2, 11 and 12, a prying wedge section 91 is integrally formed at an adjoining portion between the front portion 35 and the second side portion 38 of the recess 34. When the video cassette 92 is placed from the top opening 39 into the recess 34, the dustproof cover 93 located at a front end of the video cassette 92 is pivoted open by the prying wedge section 91 as shown in FIG. 11. When the top cover 83 is further pressed down, the prying section 90 thereof pivots the dustproof cover 93 to a horizontal position as shown in FIG. 12, permitting the first and second tape-driving members to pull the tape out of the video cassette 92.

Figure 13:
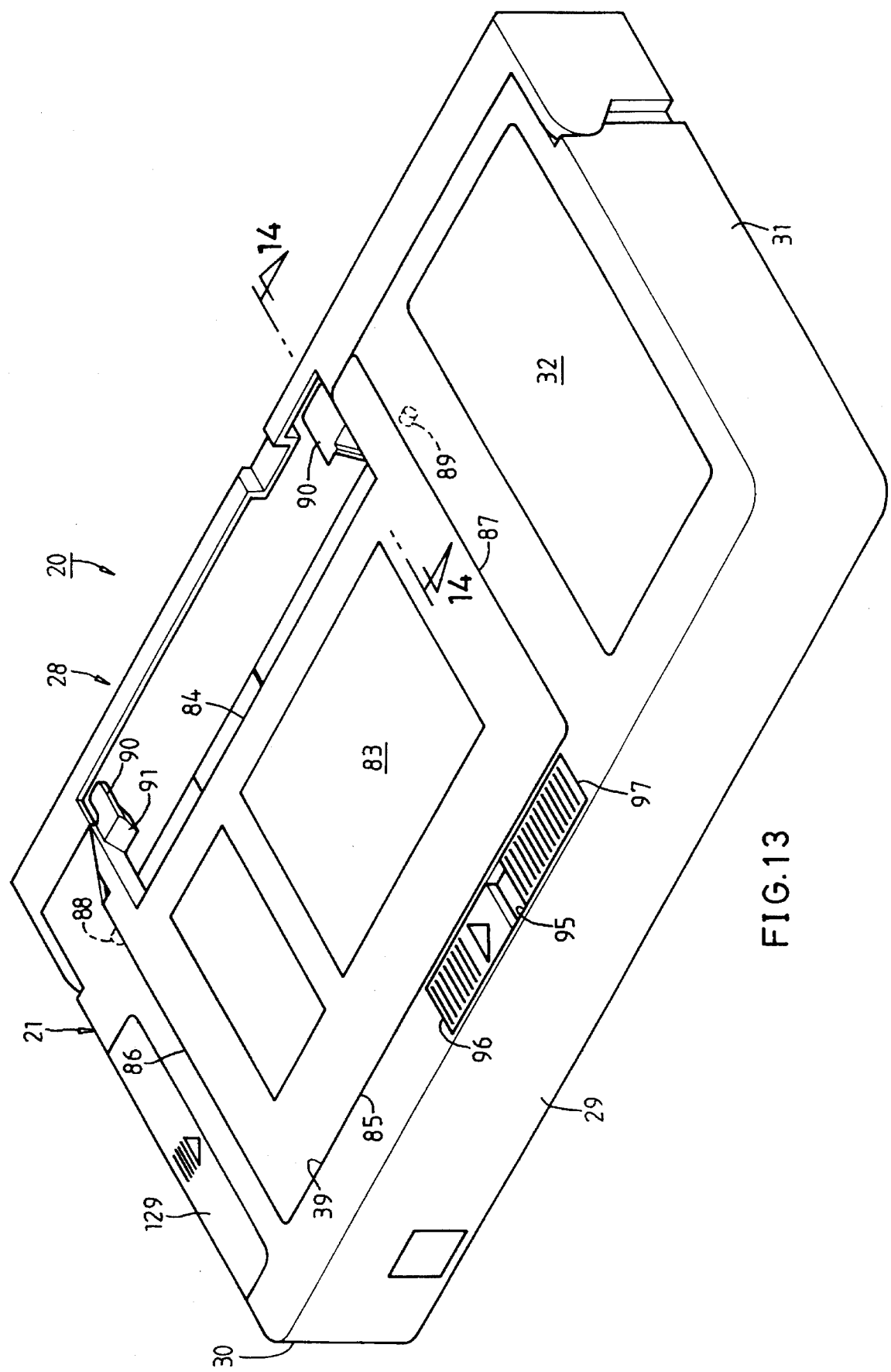
FIG. 13 is a perspective view of another embodiment of the present invention.
Figure 14:
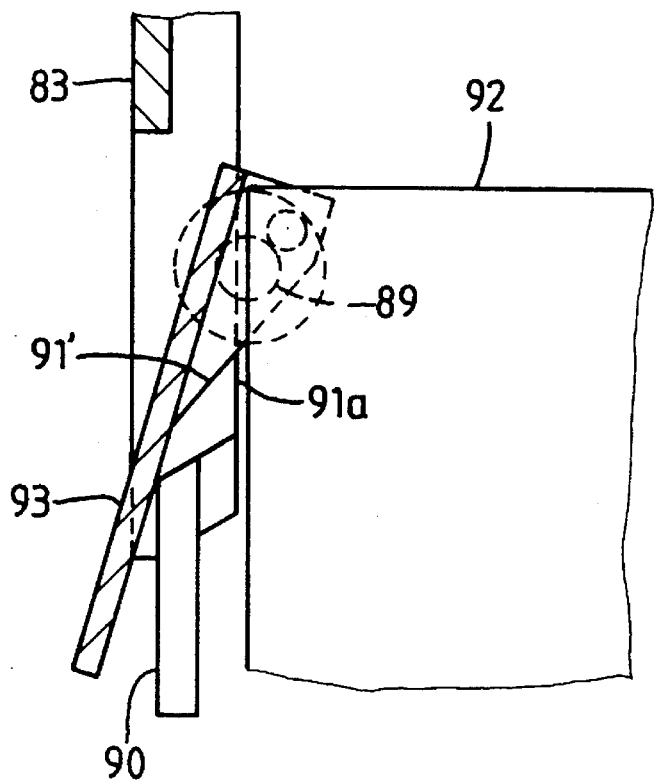
FIG. 14 is a sectional view taken along line 14—14 of FIG. 13, showing a state similar to FIG. 11.
Figure 15:
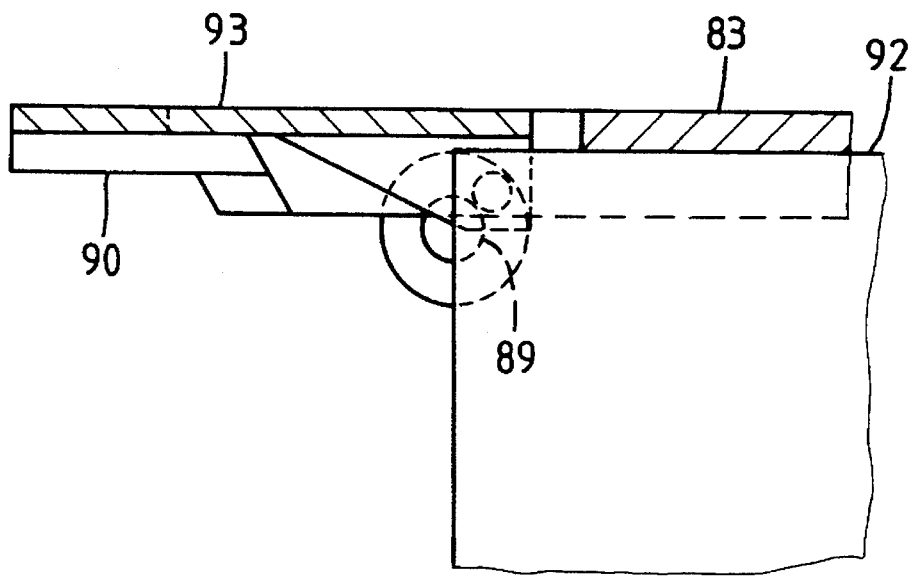
FIG. 15 is a sectional view according to FIG. 14, showing a state subsequent to FIG. 14 and similar to FIG. 12.

As shown in FIGS. 13, 14 and 15. The prying wedge section 91 can be alternatively integrally formed under the top cover 83. Before the video cassette 92 is placed into the recess 34, the top cover 83 is positioned upright as shown in FIG. 14. At this time, a tip 91a of the prying wedge section 91' of the top cover 83 points upward and can easily pry the dustproof cover 93 open and the prying section 90 can pivot the dustproof cover 93 to a horizontal position as shown in FIG. 15.

Please refer to FIGS. 1 and 2. A channel 95 is formed on the top wall 32 of the housing 21 between the recess 34 and the back portion 29 of the housing 21. A first and a second switches 96, 97 are slidably disposed in the channel 95, wherein the first switch 96 controls the opening/closing of the top cover 83 and the second switch 97 controls the rotational direction of the motor 26.

Figure 4:
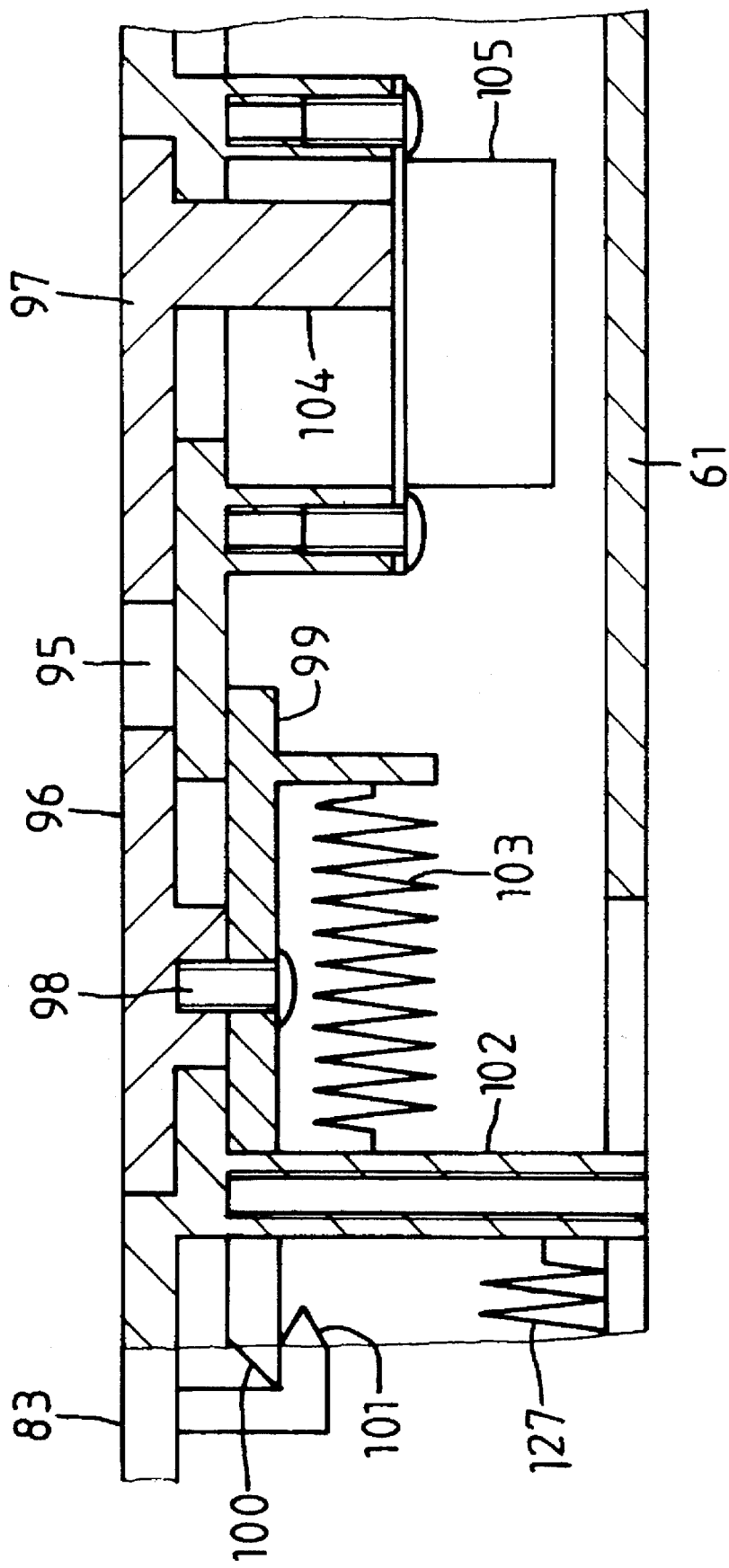
FIG. 4 is a sectional view taken along line 4—4 of FIG. 1, showing a first and a second operating switches for respectively, controlling the opening/closing of the top cover and the rotational direction of the motor.

As shown in FIGS. 1, 2 and 4, the first switch 96 extends through the channel 95 and is secured to a lock pin 99 by a screw 98. As shown in FIG. 4, a left end of the lock pin 99 is formed with a wedge section 100, whereby a latch hook 101 of the top cover 83 can slide over the wedge section 100 to be latched thereby, making the top cover 83 locked in a close position. The lock pin 99 is connected with a post 102 of the housing 21 by a spring 103 which keeps the lock pin 99 locking the latch hook 101.

Figure 8:
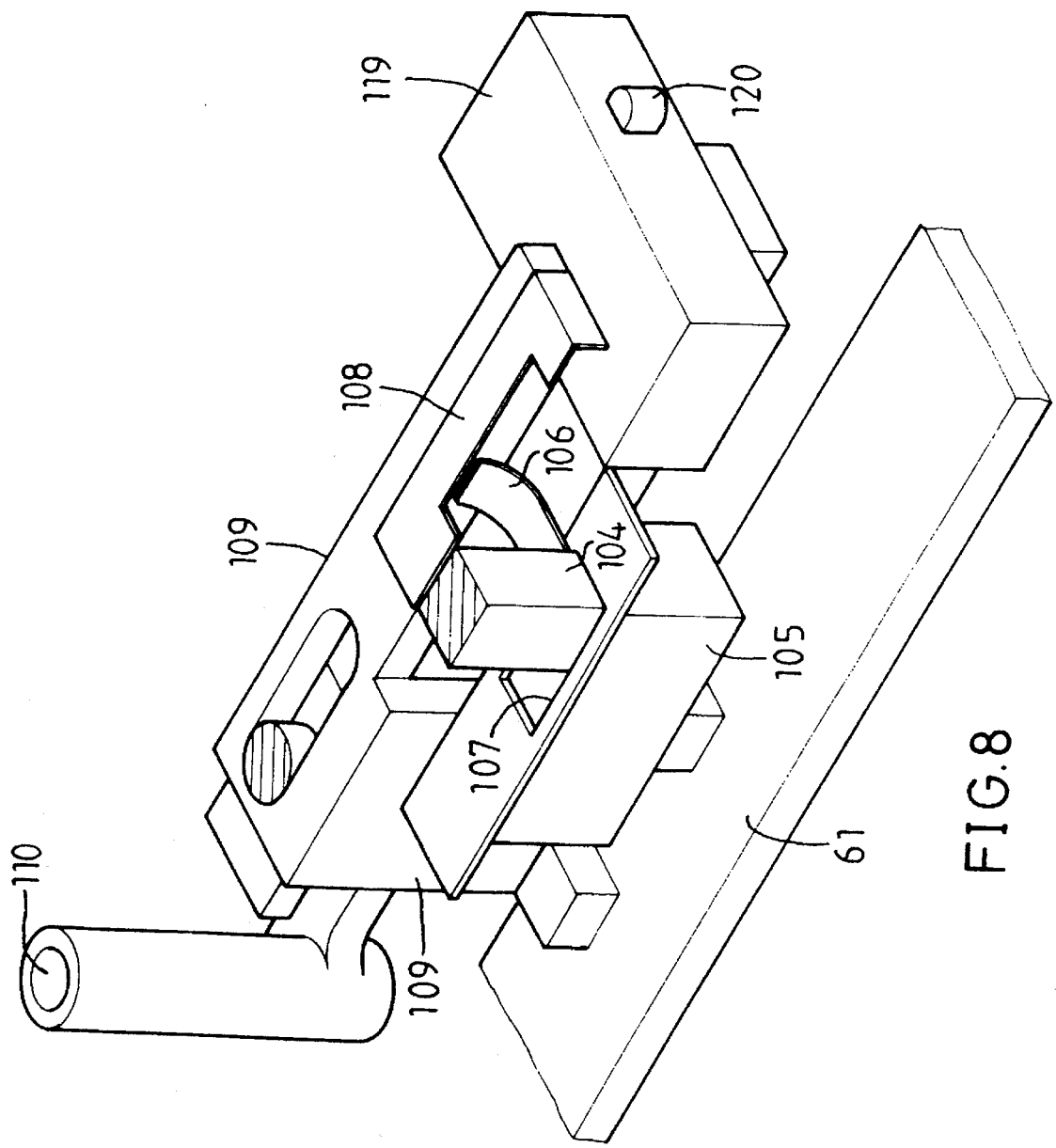
FIG. 8 is an enlarged perspective view of area 8 defined by phantom lines of FIG. 2.

Please refer to FIGS. 1, 2, 4 and 6. The second switch 97 passes through the channel 95 and is connected with a double-position slidable switch 105 via a vertical post 104 so as to control the rotational direction of the motor 26. Referring to FIG. 8, the post 104 is connected with an electrically conductive plate 106 which can move along with the post 104 within a slide slot 107 of the slidable switch 105 to contact with or separate from another conductive plate 108. The conductive plate 108 is fixed on an insulative seat 109 which is fixedly mounted on the first transmission rod 61 and moved-left and right along therewith.

Figure 7:
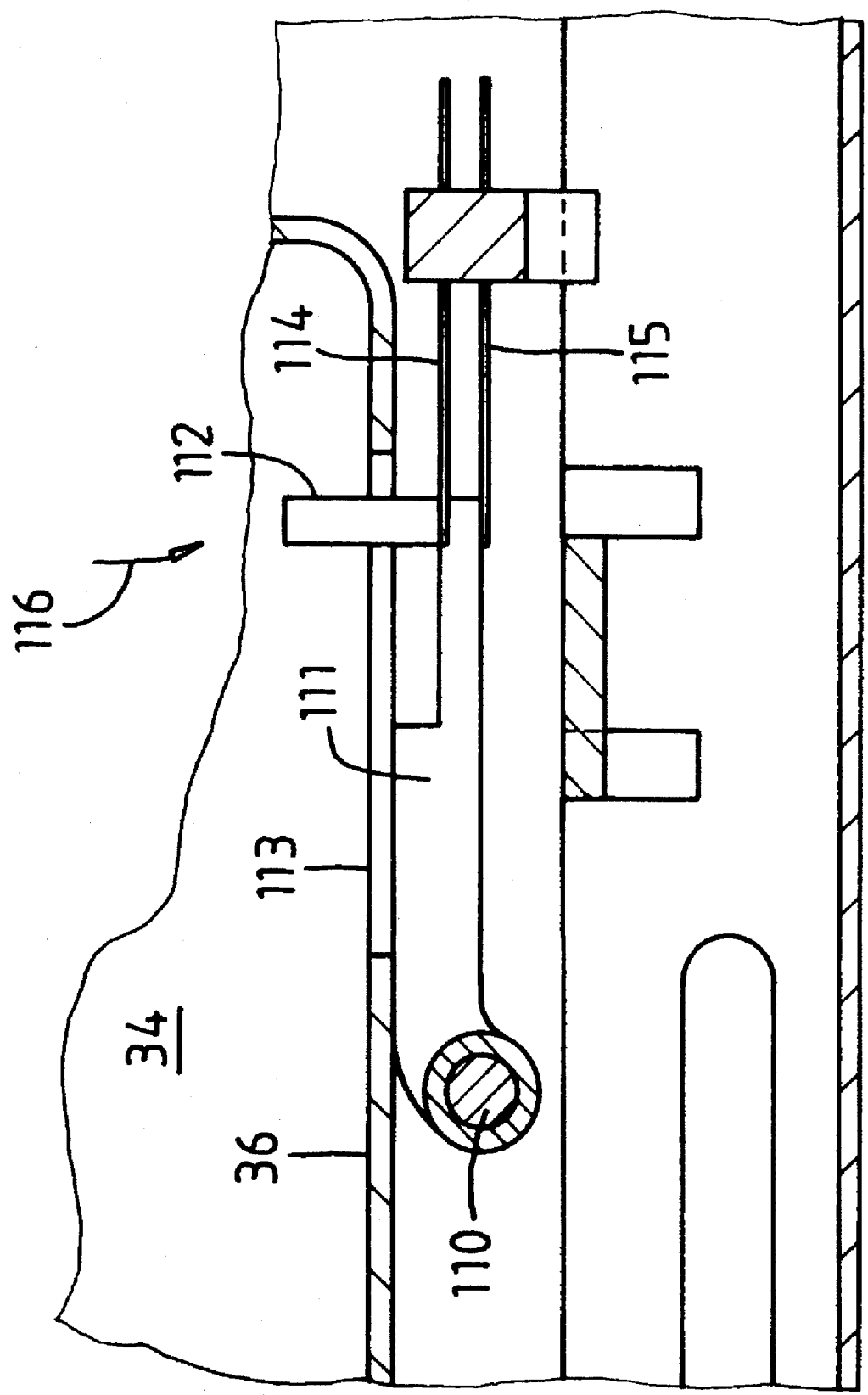
FIG. 7 is a sectional view taken along line 7—7 of FIG. 5, showing the relationship between the contact member and two resilient conductive plates.

Referring to FIGS. 2 and 7, a contact member 111 is pivotally disposed on a shaft 110 near the back portion 36 of the recess 34. A right end of the contact member 111 has a contact section 112 which extends through a hole 113 of the back portion 36 of the recess 34 into the recess 34. The contact member 111 abuts against one side of two resilient conductive plates 114, 115. When the video cassette is placed into the recess 34, the contact section 112 is forced by the video cassette to rotate in a direction indicated by arrow 116 and bias the conductive plate 114 toward the conductive plate 115, making the two conductive plates 114, 115 contact with each other to close the circuit.

Figure 5:
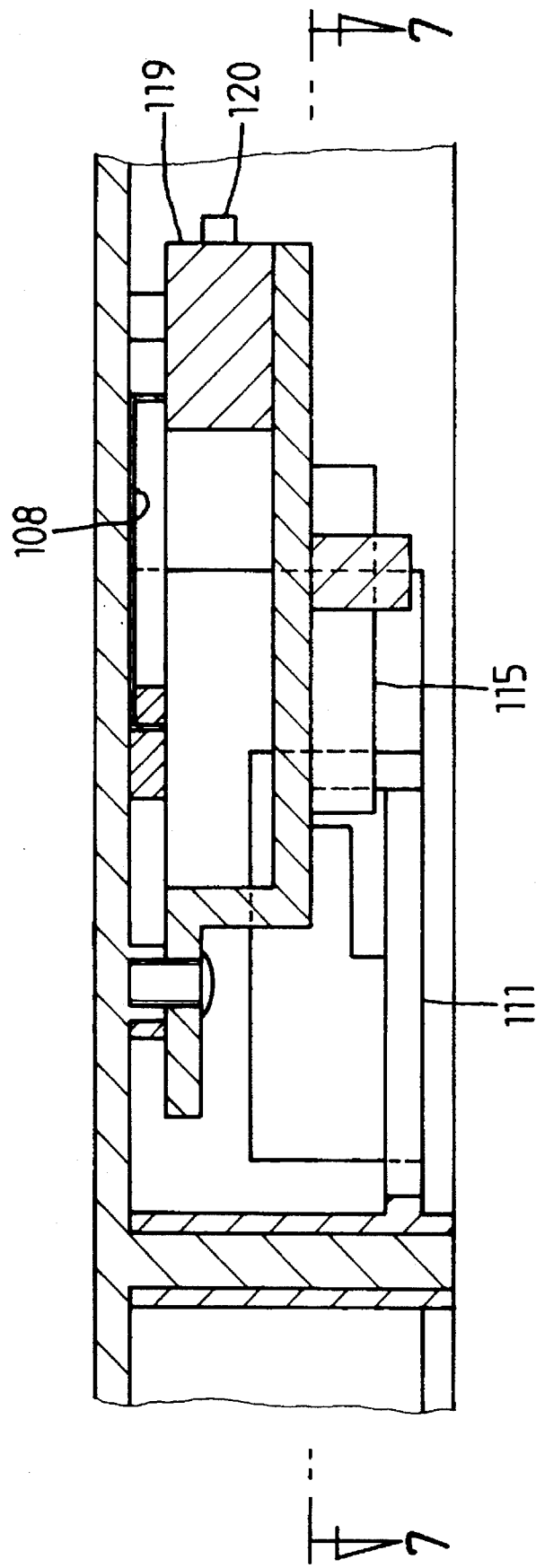
FIG. 5 is a sectional view taken along line 5—5 of FIG. 2, showing the power switches for opening/closing the circuit.
Figure 6:
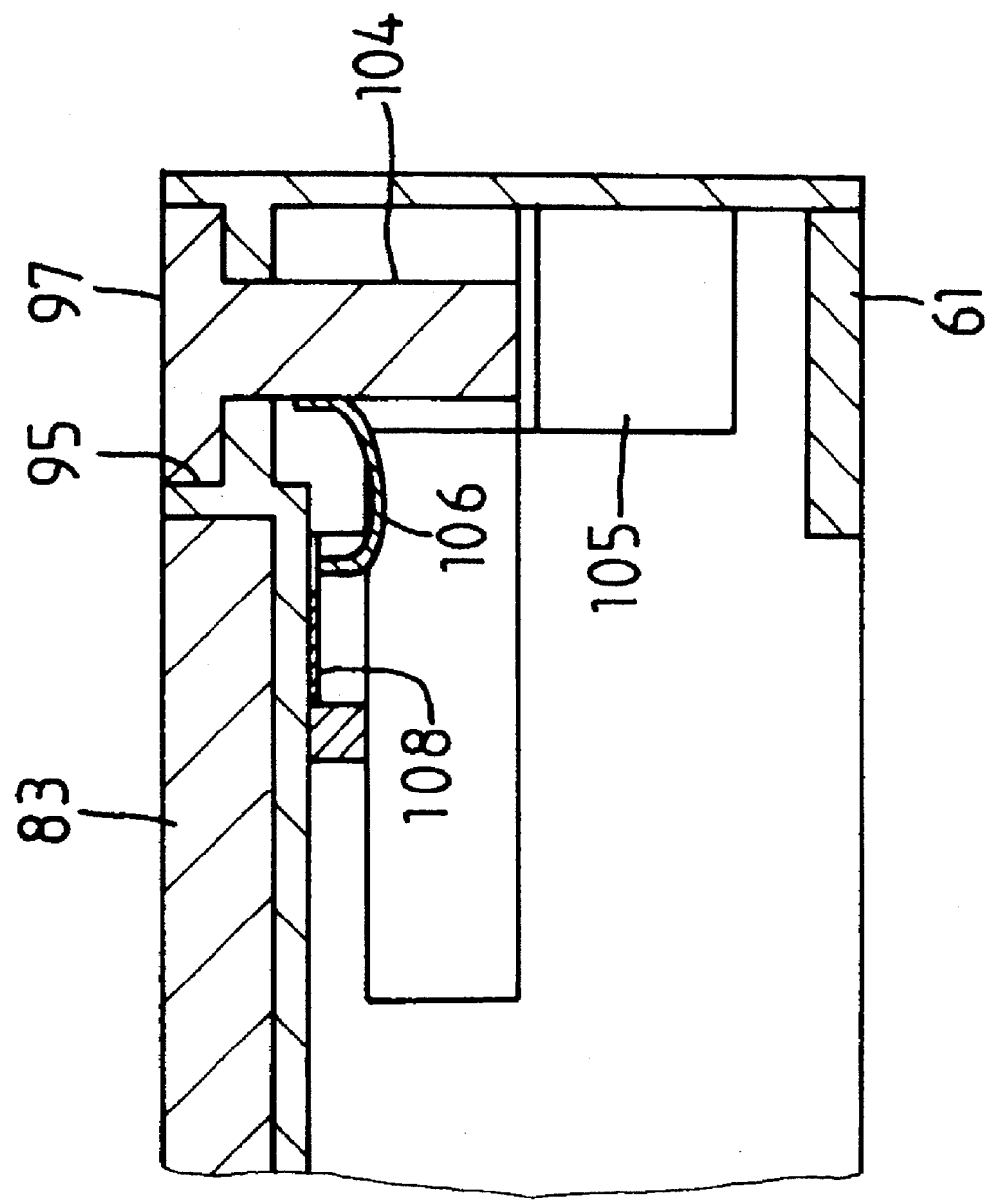
FIG. 6 is a sectional view taken along line 6—6 of FIG. 1, showing the relationship between the second operating switch and the power switches.
Figure 9:
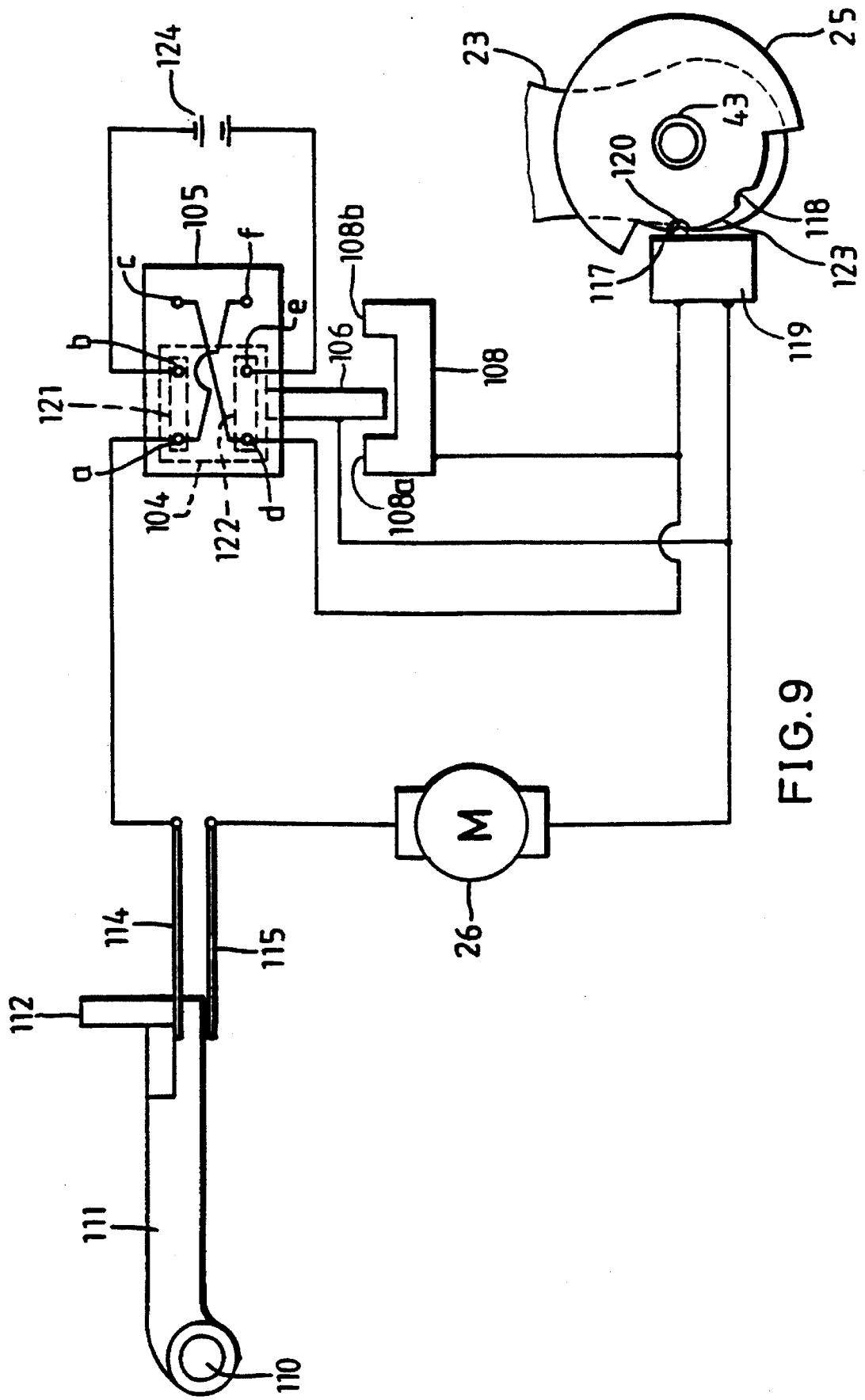
FIG. 9 is a circuit diagram of the present invention.

As shown in FIGS. 2, 5 and 9, two power-interrupting sections 117, 118 are formed in second gear 25 which is coupled to the second tape-driving member 23 and a switch 119 is disposed beside the two power-interrupting sections 117, 118. When a contact section 120 of the switch 119 enters the power-interrupting sections 117, 118, the switch 119 is in an open state.

As shown in FIGS. 1, 2 and 9, when the video cassette is placed into the recess 34, the contact section 112 is urged by the cassette to make the conductive plates 114, 115 contact with each other, whereby the circuit can judge whether the cassette is placed in the recess. At this time, although the conductive plates 114, 115 are electrically connected, the switch 119 is in an open (off) state and the two conductive plates 106, 108 are separated from each other, so that the motor 26 is still not powered on and the two tape-driving members are not actuated. However, when the switch 97 shown in FIG. 1 is moved right, the post 104 of the double-position slidable switch 105 and the conductive plate 106 shown in FIG. 9 are both moved right and two conductive plates 121, 122 of the double-position slidable switch 105 are simultaneously driven to right side by the post 104 to respectively electrically connect contact points d and c and contact points e and f of the switch 105. At this time, the switch 119 is still closed. However, the conductive plate 106 contacts with a contact section 108a formed on a left side of the conductive plate 108, so that the motor 26 is provided with power by a battery 124 to clockwise rotate as shown in FIG. 2. When the power generated by the motor 26 is sequentially transmitted through the spiral wheel 56 to the sun wheel 53, making the same counterclockwise rotate, the frictional force between the sun wheel 53 and shaft 59 or the frictional force between the shaft 59 and the rotary arm 52 will make the rotary arm 52 counterclockwise rotate about the shaft 59 and thus make the planet wheels 54, 55 counterclockwise revolve around the sun wheel 53. The planet wheel 55 is to mesh with the gear 50 and once the planet wheel 55 meshes with the gear 50, the engagement between the rotary arm 52 and the sun wheel 53 becomes idle. At this time, the power is transmitted sequentially thorough the sun wheel 53, planet wheels 54, 55, gear 50 and gear 49 to the second gear 25, making the second tape-driving member 23 rotate counterclockwise about the pivot shaft 43, that is, making the second tape-driving member 23 move from the non operative position as shown in FIG. 2 to the operative position as shown in FIG. 3.

As shown in FIG. 2, the second tape-driving member 23 drives the first transmission rod 61 to move left by means of the pin member 66 and guide slot 67. The first transmission rod 61 in turn via the pin member 70 and guide slot 69 makes the pivoting rod 62 counterclockwise rotate about the pivot shaft 68. The pivoting rod 62 in turn via the pin member 75 and guide slot 76 makes the second transmission rod 63 move upward. The second transmission rod 63 in turn via the pin member 77 and the guide slot 78 drives the first tape-driving member 22 to counterclockwise rotate about the pin member 73 from a non operative position shown in FIG. 2 to an operative position shown in FIG. 3.

As shown in FIG. 9, when the second tape-driving member 23 rotates clockwise with second gear 25, a cam section 123 between the two power-interrupting sections 117, 118 on gear 25 will bias against the contact section 120 of the switch 119, placing the switch 119 in a closed (on) state. Thereafter, because the conductive plate 108 moves left along with the first transmission rod 61 (as shown in FIG. 8) to make the contact section 108a of the conductive plate 108 separate from the conductive plate 106 and only the switch 119 is in the close state, once the second tape-driving member 23 reaches the operative position shown in FIG. 3, the power-interrupting section 118 of the second gear 25 is aligned with the contact section 120 of the switch 119, making the contact section 120 hidden in the power-interrupting section 118 to open (off) the switch 119 and cut off the power for the motor 26. At this time, the first and second tape-driving members 22, 23 remain in the operative position as shown in FIG. 3 and the adapter with the video cassette can be placed into a video cassette recorder for displaying or recording operation.

Reversely, when it is desired to take the video cassette out of the adapter 20, the switch 97 (as shown in FIG. 1) is moved right and the post 104 under the switch 97 (as shown in FIG. 9) is moved from a right side of switch 105 to a left side thereof, making the conductive plates 121, 122 respectively connect contact points a and b and contact points d and f. At this time, the switch 119 is still in an open state. Simultaneously, the conductive plate 106 contacts with a contact section 108b formed on a right side of the conductive plate 108 to close the circuit. Because the contact points a and f of the switch 105 are connected with each other and the contact points c and d of the switch 105 are connected with each other, the battery 104 provides the motor 26 with power with reverse polarity, making the motor 26 reversely counterclockwise rotate. As shown in FIG. 2, the power generated thereby is transmitted sequentially through the spiral wheel 56 to drive the sun wheel 53 to clockwise rotate. At this time, the frictional force between the sun wheel 53 and the shaft 59 or the frictional force between the shaft 59 and the rotary arm 52 makes the rotary arm 52 clockwise rotate about the shaft 59 and makes the planet wheels 54, 55 clockwise revolve around the sun wheel 53, wherein once the planet wheel 55 disengages from the gear 50 and meshes with the gear 47, the power of the motor 26 is transmitted through the spiral wheel 56, sun wheel 53, planet wheels 54, 55, gear 47 and gear 46 to make the first gear 24 rotate. At this time, the first gear 24 drives the tape-winding wheel of the video cassette to rotate and wind up the tape. When wound, the tape simultaneously pulls the first tape-driving member 22 and second tape-driving member 23 from the operative position as shown in FIG. 3 back to the non operative position as shown in FIG. 2. Because both the first and second tape-driving members 22 and 23 are pulled by the tape back to the non operative position, the second transmission rod 63, pivoting rod 62 and first transmission rod 61 are all returned from the position shown in FIG. 3 to the position shown in FIG. 2. For facilitating the rightward returning of the second transmission rod 61, as shown in FIGS. 1, 2 and 4, a post 125 is disposed on the housing 21 and a post 102 is disposed on the second transmission rod 61 and connected with the post 125 by a spring 127. The resilient force of the spring 127 helps the tape in moving the first transmission rod 61, pivoting rod 62, second transmission rod 63, first tape-driving member 22 and second tape-driving member 23 from the position of FIG. 3 to the position of FIG. 2. As a result, the tape will not be excessively tensioned during the pulling operation.

Referring to FIG. 9, when the second tape-driving member 23 is counterclockwise rotated, the cam section 123 of gear 25 presses down the contact section 120 of the switch 119, making the switch 119 in a close (on) state. In turn, the conductive plate 108 moves right along with the first transmission rod 61 as shown in FIG. 8 to make the contact section 108b of the conductive plate 108 separate from the conductive plate 106. At this time, only the switch 119 remains in close (on) state. Therefore, when the second tape-driving member 23 returns from the operative position to the non operative position, the power-interrupting section 118 of the second gear 25 is right aligned with the contact section 120 of the switch 119 so that the power for the motor 26 is cut off and the operation is stopped.

When it is desired to take the video cassette out of the adapter 20, as shown in FIGS. 1 and 4, the switch 96 is pushed rightward to disengage the wedge section 100 of the lock pin 99 from the latch hook 101 of the top cover 83. At this time, a spring (not shown) disposed between the top cover 83 and the housing 21 automatically pivots the top cover 83 upward about the two pivot sections 88, 89, permitting the video cassette to be taken out of the adapter 20.

Figure 10:
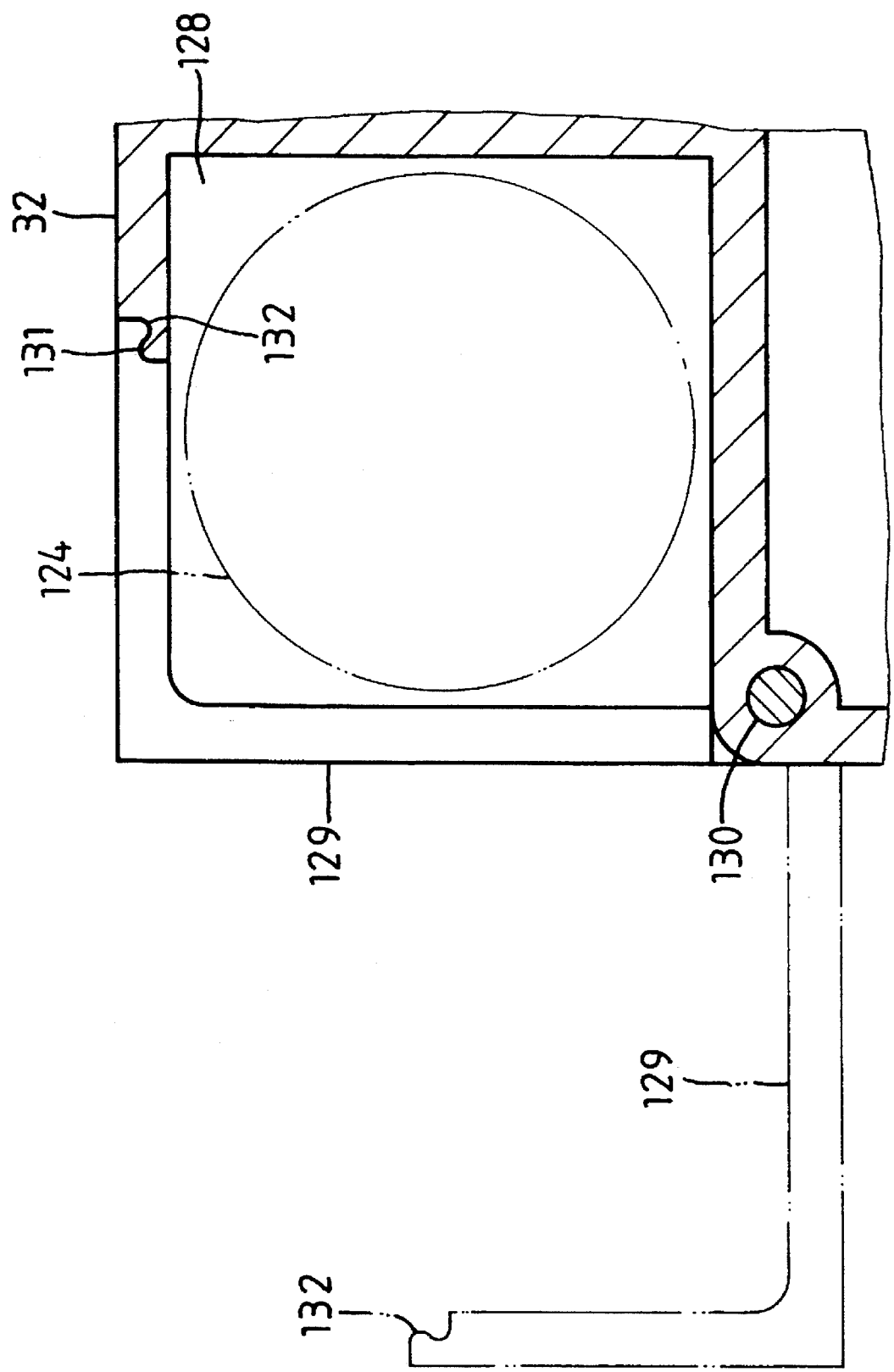
FIG. 10 is a sectional view taken along line 10—10 of FIG. 1, showing the structure of the cover member for the battery.

As shown in FIGS. 1, 10 and 13, the first side portion 30 of the housing 21 is disposed with a battery chamber 128 for containing a battery 124. A cover member 129 having two lateral pivot shafts 130 is pivotally connected with two side walls of the chamber 128. In addition, a latch section 131 is formed on the top wall 32 of the housing 21 and a latch section 132 is formed on the cover member 129 to lock with the latch section 131 of the housing 21.

As shown in FIGS. 2 and 3, because the spiral wheel 56 of the selective power-transmitting mechanism 27 is engaged with the sun wheel 53, once the second tape-driving member 23 is rotated to the operative position of FIG. 3, by means of the engagement between the spiral wheel 56 and sun wheel 53 when not rotated, the second tape-driving member 23 will not suffer the pulling force of the tape and will reliably remain in the operative position without unexpectedly returning to the non operative position.

The advantages of the present invention are as follows:

1. The motor 26 cooperates with the selective power-transmitting mechanism 27, first tape-driving member 22 and second tape-driving member 23 to automatically pull the tape out of the video cassette to the front portion of the adapter 20 and automatically return the tape into the video cassette. Therefore, it is more convenient to use the present adapter.

2. By means of the selective power-transmitting mechanism 27, the power is automatically selectively transmitted to the second tape-driving member 23 or the video cassette in accordance with the clockwise or counterclockwise rotation of the motor 26.

3. The second tape-driving member 23 is coupled to the gear 25 which is formed with two power-interrupting sections 117, 118, whereby when the second tape-driving member 23 reaches the operative or non operative position, the power for the motor 26 is accurately cut off to stop the second tape-driving member 23 at a true position.

4. The prying section and prying wedge section are able to easily and smoothly open the dustproof cover of the video cassette.

It is to be understood that the above description and drawings are only used for illustrating one embodiment of the present invention, not intended to limit the scope thereof. Any variation and derivation from the above description and drawings should be included in the scope of the present invention.

What is claimed is:

1. A video cassette adapted comprising:
   a housing having a front portion, a back portion, a first and second side portion, a top wall, a bottom wall and a recess for receiving a video cassette, said recess having a front portion communicating with said front portion of said housing, a back portion, a first and second side portions, a top opening and a bottom wall;

a first tape-driving member one end of which is pivotally disposed between said first side portion of said housing and said first side portion of said recess, and the other end of which is reversibly moveable from said front portion of said recess to said front portion of said housing and having a roller rotatably coupled thereto for engaging a portion of a tape of the video cassette;

a second tape-driving member one end of which is pivotally coupled to said housing between said second side portion of said housing and said second side portion of said recess by a pivot shaft, and the other end of which is reversibly moveable from said front portion of said recess to said front portion of said housing and having a roller rotatably coupled thereto for engaging a portion of the tape of the video cassette;

linkage means disposed within said housing and coupled to both said first tape-driving member and said second tape-driving member for displacing each with respect to the other;

a first gear rotatably disposed in said housing and extending into said second side portion of said recess for meshing with a gear disposed on a tape-winding shaft of the video cassette;

a second gear coaxially coupled to said pivot shaft for rotation with said second tape-driving member;

a motor disposed in said housing, said motor being selectably operable to rotate a motor shaft in both a clockwise and a counterclockwise direction; and a selective power-transmitting mechanism including a power inputting portion and a power outputting portion, said power inputting portion being operably connected with said motor shaft, said selective power-transmitting mechanism being pivotally disposed in said housing with said power outputting portion automatically displaced between a first selection position to couple said power outputting portion with said first gear responsive to counterclockwise rotation of said motor shaft and a second selection position to couple said power outputting portion with said second gear responsive to clockwise rotation of said motor shaft said power outputting portion driving said second tape-driving member through said second gear and said first tape driving arm through said linkage means to move from said front portion of said recess to said front portion of said housing and pull a tape of the video cassette out of the cassette to said front portion of said housing responsive to said clockwise rotation of said motor shaft, said power outputting portion driving said first gear responsive to said counterclockwise rotation of said motor shaft for driving the gear of the tape-winding shaft of the video cassette to wind the tape respectively engaging said rollers of said first and second tape-driving members from said front portion of said housing into the video cassette and thereby displace said first and second tape driving members respectively from said front portion of said housing to said front portion of said recess.

2. An adapter as claimed in claim 1, wherein said power-transmitting mechanism further includes two spiral wheels which mesh with each other.

3. An adapter as claimed in claim 1, wherein said power-transmitting mechanism further includes a spiral rod and a spiral wheel meshing with said spiral rod.

4. An adapter as claimed in claim 1, wherein said power-transmitting mechanism further includes a drive gear coupled to said motor shaft and an assembly of a sun wheel meshingly engaged with said drive gear for rotation in either of two opposing directions, a rotary arm member having one end pivotally coupled to said housing coaxial said sun wheel and an opposing end supporting a shaft and planet wheels rotatably coupled to said shaft of said rotary arm member in coaxial relationship and meshingly engaged with said sun wheel, said planet wheels selectively driving said first or second gear responsive to said direction of rotation pf said sun wheel.

5. An adapter as claimed in claim 1, further comprising a top cover having a front edge, a back edge and two opposite lateral edges, said top cover covering said top opening of said recess, two ends of said front edge of said top cover respectively having pivot sections which respectively pivotally connect with said first and second side portions of said recess, so that said top cover is pivotable between said top opening and said front portion of said recess, a prying section extending forward from one end of said front edge of said top cover, whereby when said top cover is pivoted open, said prying section extends into an inner side of a dustproof cover of the video cassette and when said top cover is pivoted to cover said top opening, said prying section pivots said dustproof cover from said front portion of said recess to said top wall of said housing.

6. An adapter as claimed in claim 5, further comprising a prying wedge section formed on said prying section for pivoting the dustproof cover open.

7. An adapter as claimed in claim 5, further comprising a prying wedge section formed on an adjoining section which connects said front portion of said recess with one of said side portions thereof.

8. An adapter as claimed in claim 1, wherein said linkage means includes:

a first transmission rod having opposing first and second ends being slidably disposed between said back portion of said housing and said back portion of said recess for displacement in a longitudinal direction, said first end of said first transmission rod being operably connected with said second tape-driving member for cooperative displacement therewith;

a second transmission rod having opposing first and second ends being slidably disposed between said first side portion of said housing and said first side portion of said recess for displacement in a direction transverse said longitudinal direction, said first end of said second transmission rod being operably connected with said first tape-driving member for cooperative displacement therewith; and a pivoting rod pivotally coupled to said housing intermediate a pair of opposing ends thereof, said opposing ends of said pivoting rod being angularly offset one with respect to the other, said pivoting rod being disposed adjacent an intersection of said back portion of said housing and said first side portion of said housing, each of said opposing ends of said pivoting rod being coupled to a respective one of said second ends of said first and second transmission rod for translating said displacement in said longitudinal direction to said displacement in said transverse direction.

9. An adapter as claimed in claim 1, further comprising a switch electrically coupled to said motor disposed adjacent to said second gear, said second gear having a cam section disposed between two power-interrupting sections said switch being closed by said cam section to energize said motor and opened by either of said two power-interrupting sections to de-energize said motor.

* * * * *